No. 675,933. Patented June 11, 1901.
G. E. CLOW.
SECTIONAL BALL.
(Application filed Oct. 22, 1900.)
(No Model.)
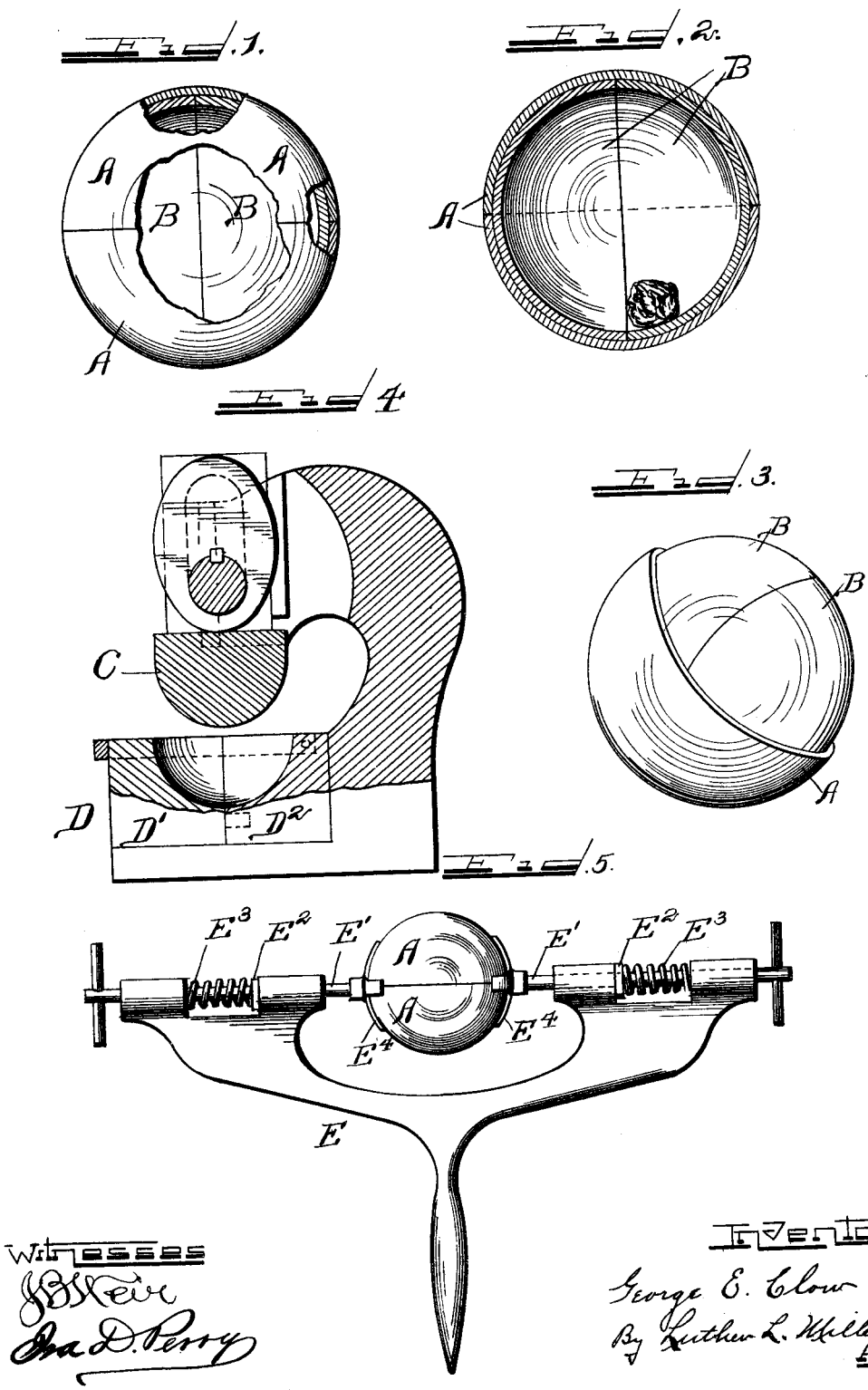

UNITED STATES PATENT OFFICE.

GEORGE E. CLOW, OF CHICAGO, ILLINOIS.

SECTIONAL BALL.

SPECIFICATION forming part of Letters Patent No. 675,933, dated June 11, 1901.

Application filed October 22, 1900. Serial No. 33,907. (No model.)

*To all whom it may concern:*

Be it known that I, GEORGE E. CLOW, a citizen of the United States, residing at Chicago, in the county of Cook and State of Illinois, have invented certain new and useful Improvements in Sectional Balls, of which the following is a specification.

The object of this invention is the production of a hollow ball made up of a plurality of sections.

In the accompanying drawings, Figure 1 is a perspective view of a ball embodying the features of this invention, portions of the walls of said ball being broken away to show its construction. Fig. 2 is a central section through a formed ball, showing a lump of solder within the inner sphere, which lump of solder is intended to be melted by the application of heat to the outer sphere and when melted to enter the interstices and join the hemispheres firmly together. Fig. 3 is a view of the inner shell or sphere in position in a hemisphere of the outer shell, showing the relative positions of the circular joints between the hemispheres of the two shells. Fig. 4 is a view showing a press adapted to form hemispheres from circular pieces of sheet metal. Fig. 5 shows a clamp adapted to grasp a ball in the stage of completion shown in Fig. 2 in order to hold it over a flame to melt the solder on the interior of the inner sphere of the ball.

Like letters of reference indicate corresponding parts throughout the several views.

In the production of a ball embodying the features of my invention I first form from pieces of sheet metal the hemispheres A of a certain diameter and another set of similar hemispheres B, the latter being of a diameter slightly less than that of the hemispheres A— sufficiently less to permit a sphere formed from the hemispheres B to just fit within a sphere formed from the hemispheres A. I then select two of the smaller hemispheres B and fitting them together and placing a piece of solder in their interior put them into one of the larger hemispheres A, adjusting the joint between the inner hemispheres B so that its plane is at a right angle (or a considerable angle) with the circular edge of the larger hemisphere A. I then place another one of the larger hemispheres A over the inner sphere B B, clamping the hemispheres A A together by any suitable means, as by the device shown in Fig. 5. The ball comprising the two spheres A A B B is held over a flame or subjected in any other suitable manner to heat sufficient to melt the solder within the inner sphere. The ball is then turned in various ways to cause the melted solder to run into the joints between the hemispheres and into the interstices between the inner and outer spheres. The outer surface of the ball thus formed may be polished or finished as desired.

The press and the clamp shown in Figs. 4 and 5, respectively, are merely suggestive of one way in which the segments of which this improved ball is made up may be formed. I do not desire to limit myself to any particular way of producing these segments or of assembling them.

The press is of the ordinary kind, having the male and female dies C and D, respectively, the former being capable of a vertical reciprocation, the latter being held firmly on the bed of the press. The female die D is divided into the two parts D' and D² to permit the easy withdrawal of the hemisphere formed by pressing a disk of sheet metal therein by the reciprocation of the male die C.

The clamp comprises the two-arm frame E, with two opposite spring-actuated longitudinally-movable plunger-rods E', one mounted in each arm of said frame and each having a stop-collar E² fixed thereon, also having a spring E³ between said collar E² and a portion of said frame. The inner end of each of said plunger-rods is fitted with the holding-spider E⁴, adapted to grasp the ball.

The ball hereinbefore described is particularly well adapted for ball-casters, though it may also be used in many other connections.

It is obvious that three or more hollow spheres may be used instead of two for making a sectional ball, that the hemispheres may be formed by spinning or other well-known methods instead of by pressing, that the spheres may be composed of three or more segments instead of two, as shown, and that other modifications of the manner herein shown of constructing a sectional ball may be made without departing from the spirit of my invention.

I claim as my invention—

1. A sectional ball comprising a plurality of hollow spheres, one of which spheres is made up of hollow segments, and means for securing said segments together.

2. A sectional ball comprising a plurality of hollow spheres, one or more of which spheres is made up of hollow hemispheres, and means for securing the hemispheres together.

3. A sectional ball comprising a plurality of hollow spheres, each of which spheres is made up of hollow hemispheres, and means for securing said hemispheres together.

4. A sectional ball comprising two hollow spheres, each of which spheres is made up of hollow segments, and a fusible metal for securing said segments together.

5. A sectional ball comprising two hollow spheres, each of which spheres is made up of two hollow hemispheres, and a fusible metal for securing said hemispheres together.

6. A sectional ball comprising two hollow spheres, each of which spheres is made up of two hollow hemispheres, the joint-lines between the hemispheres of the two spheres being at an angle with each other, and a fusible metal for securing said hemispheres together.

GEORGE E. CLOW.

Witnesses:
H. G. HOLZBOUER,
J. E. SPAULEIMER.